United States Patent
Breed et al.

(10) Patent No.: US 9,691,188 B2
(45) Date of Patent: *Jun. 27, 2017

(54) TOLLING SYSTEM AND METHOD USING TELECOMMUNICATIONS

(71) Applicant: Intelligent Technologies International, Inc., Miami Beach, FL (US)

(72) Inventors: David S Breed, Miami Beach, FL (US); Vyacheslav Sokurenko, Kyiv (UA)

(73) Assignee: Intelligent Technologies International, Inc., Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,828

(22) Filed: Jan. 13, 2017

(65) Prior Publication Data

US 2017/0124775 A1    May 4, 2017

Related U.S. Application Data

(63) Continuation-in-part of application No. 14/814,616, filed on Jul. 31, 2015, now Pat. No. 9,595,139, which
(Continued)

(51) Int. Cl.
*B60R 1/00* (2006.01)
*G07B 15/00* (2011.01)
(Continued)

(52) U.S. Cl.
CPC ............. *G07B 15/00* (2013.01); *G08G 1/017* (2013.01); *H04W 4/046* (2013.01)

(58) Field of Classification Search
CPC ...... B60W 30/16; G08G 1/127; G08G 1/0175
See application file for complete search history.

(56) References Cited

U.S. PATENT DOCUMENTS 3,548,212 A    12/1970  Whetter
5,101,200 A *  3/1992   Swett ............................. 340/937
(Continued)

FOREIGN PATENT DOCUMENTS

DE    102009042470 A1    3/2011
JP       09-318749 A      12/1997
(Continued)

OTHER PUBLICATIONS

Abstract of KR 20130054740.
(Continued)

*Primary Examiner* — Nam Pham
(74) *Attorney, Agent, or Firm* — Brian Roffe

(57) ABSTRACT

System, arrangement and method for tolling includes a location determining system arranged at least partly in a vehicle to determine the vehicle location during vehicular travel, a toll database including data about tolls for use of a plurality of lanes of a multi-lane roadway at a plurality of different geographic points, the toll data being different for different lanes of the multi-lane roadway at at least one geographic point, and a communications device arranged on the vehicle. A processor directs transmission including the determined vehicle location and an identification of the vehicle by the communications device to a remote site separate and apart from the vehicle. A toll is determined at the remote site based on the toll database and the vehicle location which is the lane-specific location of the vehicle or based on at least two vehicle locations each of which is a lane-specific location of the vehicle.

20 Claims, 5 Drawing Sheets

Related U.S. Application Data is a continuation-in-part of application No. 14/731,552, filed on Jun. 5, 2015, now abandoned, which is a continuation of application No. 13/603,127, filed on Sep. 4, 2012, now Pat. No. 9,053,633.

(60) Provisional application No. 62/288,255, filed on Jan. 28, 2016.

(51) Int. Cl.
*G08G 1/017* (2006.01)
*H04W 4/04* (2009.01)

(56) References Cited

U.S. PATENT DOCUMENTS

| | | | |
|---|---|---|---|
| 5,270,780 A | 12/1993 | Moran | |
| 5,408,541 A | 4/1995 | Sewell | |
| 5,490,079 A * | 2/1996 | Sharpe et al. | 705/418 |
| 5,581,630 A * | 12/1996 | Bonneau, Jr. | 382/116 |
| 5,627,511 A | 5/1997 | Takagi | |
| 5,717,389 A | 2/1998 | Mertens et al. | |
| 5,732,074 A * | 3/1998 | Spaur et al. | 370/313 |
| 5,805,082 A * | 9/1998 | Hassett | 340/928 |
| 5,867,093 A | 2/1999 | Dodd et al. | |
| 6,088,680 A | 7/2000 | Hoshino et al. | |
| 6,140,941 A * | 10/2000 | Dwyer et al. | 340/928 |
| 6,684,155 B1 | 1/2004 | Chen et al. | |
| 6,937,162 B2 | 8/2005 | Tokitsu et al. | |
| 6,959,282 B2 | 10/2005 | Kakihara et al. | |
| 7,106,212 B2 | 9/2006 | Konishi et al. | |
| 7,127,413 B1 | 10/2006 | Yanagisawa et al. | |
| 7,151,998 B2 | 12/2006 | Tajima | |
| 7,215,255 B2 | 5/2007 | Grush | |
| 7,233,260 B2 | 6/2007 | Tang et al. | |
| 8,138,949 B2 | 3/2012 | Tsuzuki et al. | |
| 8,219,443 B2 | 7/2012 | Delia et al. | |
| 8,228,205 B2 | 7/2012 | Kohli et al. | |
| 8,245,921 B2 | 8/2012 | Sol | |
| 8,265,988 B2 | 9/2012 | Hedley et al. | |
| 8,280,791 B2 | 10/2012 | Davis, III et al. | |
| 8,344,886 B2 | 1/2013 | Gravelle et al. | |
| 8,346,598 B2 | 1/2013 | Hafenscher et al. | |
| 8,374,911 B2 | 2/2013 | Glachant et al. | |
| 8,384,560 B2 | 2/2013 | Malarky | |
| 8,587,454 B1 | 11/2013 | Dearworth | |
| 8,615,424 B2 | 12/2013 | Kim | |
| 8,660,890 B2 | 2/2014 | Hedley | |
| 8,730,066 B2 | 5/2014 | Malarky | |
| 8,843,390 B2 | 9/2014 | Kang et al. | |
| 9,053,633 B2 | 6/2015 | Breed et al. | |
| 9,460,429 B2 | 10/2016 | Du | |
| 2005/0071175 A1 * | 3/2005 | Gila et al. | 705/1 |
| 2005/0097018 A1 | 5/2005 | Takida | |
| 2007/0192177 A1 | 8/2007 | Robinson et al. | |
| 2009/0171772 A1 | 7/2009 | Petrison et al. | |
| 2011/0131238 A1 | 6/2011 | Peeters et al. | |
| 2012/0215594 A1 | 8/2012 | Gravelle | |
| 2013/0006723 A1 | 1/2013 | McGowan | |
| 2013/0006724 A1 | 1/2013 | Simanek | |
| 2013/0006725 A1 | 1/2013 | Simanek | |
| 2013/0018705 A1 | 1/2013 | Heath et al. | |
| 2013/0127643 A1 | 5/2013 | Malarky | |
| 2014/0025444 A1 | 1/2014 | Willis | |
| 2014/0278838 A1 | 9/2014 | Novak | |
| 2014/0310074 A1 | 10/2014 | Gravelle | |
| 2015/0062340 A1 | 3/2015 | Datta et al. | |
| 2015/0088617 A1 | 3/2015 | Geist et al. | |
| 2015/0106171 A1 | 4/2015 | Zou et al. | |
| 2015/0134428 A1 | 5/2015 | Li et al. | |
| 2015/0161578 A1 | 6/2015 | Ahmed et al. | |
| 2016/0171787 A1 | 6/2016 | Yohalashet | |
| 2016/0209219 A1 | 7/2016 | Grush et al. | |

FOREIGN PATENT DOCUMENTS

| | | |
|---|---|---|
| KR | 20130054740 A | 5/2013 |
| WO | 9701111 A2 | 1/1997 |
| WO | 2015024126 A1 | 2/2015 |

OTHER PUBLICATIONS

Abstract of DE 102009042470.
Electronic Toll Collection Technologies for Road Pricing, P.J. Fumes et al., TCL workshop—Asilomar—Jun. 27-29, 2011.
Performance Aspects of Navigation Systems for GNSS-Based Road User Charging, R. Toledo-Moreo et al., Proceedings of the 23rd International Technical Meeting of The Satellite Division of the Institute of Navigation (ION GNSS 2010), Sep. 21-24, 2010.
Thales, Road Tolling Satellite Solution, www.thalesgroup.com/security-services, data unknown.
Efkon, Satellite Tolling, www.efkon.com/en/products-solutions/ITS/satellite-tolling.php, date unknown.
Siemens, Satellite-based tolling system Sitraffic Sensus, www.mobility.siemens.com/mobility/global/SiteCollectionDocuments/en/road-solutions/interurban/tolling-systems-for-freeways/sitraffic-sensus-en.pdf, date unknown.
Can GNSS solve the tolling world's woes?, First published in ITS International Nov. Dec. 2013 as GNSS tolling—heaven sent solution or big brother nightmare?.
Spotlight-egnos-based-road-charging-ibtta-2014, www.gsa.europa.eu/news/spotlight-egnos-based-road-charging-ibtta-2014, published Nov. 3, 2014.
European-gnss-creates-opportunities-fairer-road-tolling, www.gsa.europa.eu/news/european-gnss-creates-opportunities-fairer-road-tolling, published Mar. 31, 2015.
Gentex and TransCore Complete Agreement to Provide Automakers With Vehicle-Integrated, Nationwide Tolling Solution, Jan. 4, 2016, retrieved from the Internet.
Expressway Authority to test toll payments via cell phone, Joe Ruble, Jan. 15, 2016, retrieved from the Internet.
Electronic toll collection global news, Copyright © PTOLEMUS Consulting Group 2017, retrieved from the Internet Jan. 13, 2017.
Tollway test zone may pave way for smartphones to pay tolls, Richard Wronski, Chicago Tribune, Jul. 16, 2014.
SMART Options Paper, Context and Considerations of a Mileage Fee for Michigan, Prepared by SMART—Sustainable Mobility & Accessibility Research & Transformation at the University of Michigan for the Michigan Environmental Council, Apr. 2014, Elizabeth Treutel and Alexandro Bazan.
H.R. Everett, Survey of Collision Avoidance and Ranging Sensors for Mobile Robots, 5 Robotics and Autonomous Systems 5 (1989).
P.S. Pencikowski, A Low Cost Vehicle-Mounted Enhanced Vision System Comprised of a Laser Illuminator and Range-Gated Camera, in Enhanced and Synthetic Vision 1996 222 (Jacques G. Verly ed.).
Governments Look for New Ways to Pay for Roads and Bridges, John Schwartz, Feb. 14, 2013, The New York Times.

* cited by examiner

| | |
|---|---|
| Tolls billed this trip | $12.00 |
| Kilometers traveled | 398.20 |
| Kilometers remaining | 272.67 |
| Tolls remaining | $6.25 |
| Tolls for alternative route | $1.45 |

*Fig. 4*

TOLLING SYSTEM AND METHOD USING TELECOMMUNICATIONS

CROSS-REFERENCE TO RELATED APPLICATIONS

This application claims priority under 35 U.S.C. §119 of U.S. provisional patent application Ser. No. 62/288,255 filed Jan. 28, 2016, and is a continuation-in-part of U.S. patent application Ser. No. 14/814,616 filed Jul. 31, 2015, which is a continuation-in-part of U.S. patent application Ser. No. 14/731,552 filed Jun. 5, 2015, now abandoned, which is a continuation of U.S. patent application Ser. No. 13/603,127 filed Sep. 4, 2012, now U.S. Pat. No. 9,053,633, all of which are incorporated by reference herein.

This application is related to U.S. patent application Ser. No. 09/177,041 filed Oct. 22, 1998, now U.S. Pat. No. 6,370,475, Ser. No. 09/523,559 filed Mar. 10, 2000, now abandoned, Ser. No. 09/679,317 filed Oct. 4, 2000, now U.S. Pat. No. 6,405,132, Ser. No. 09/909,466 filed Jul. 19, 2001, now U.S. Pat. No. 6,526,352, Ser. No. 10/118,858 filed Apr. 9, 2002, now U.S. Pat. No. 6,720,920, Ser. No. 10/216,633 filed Aug. 9, 2002, now U.S. Pat. No. 6,768,944, Ser. No. 10/822,445 filed Apr. 12, 2004, now U.S. Pat. No. 7,085,637, Ser. No. 11/028,386 filed Jan. 3, 2005, now U.S. Pat. No. 7,110,880, Ser. No. 11/034,325 filed Jan. 12, 2005, now U.S. Pat. No. 7,202,776, Ser. No. 11/421,500, now U.S. Pat. No. 7,672,756, Ser. No. 11/461,619 filed Aug. 1, 2006, now U.S. Pat. No. 7,418,346, Ser. No. 11/464,385 filed Aug. 14, 2006, now U.S. Pat. No. 7,629,899, Ser. No. 11/562,730 filed Nov. 22, 2006, now U.S. Pat. No. 7,295,925, Ser. No. 11/681,817 filed Mar. 5, 2007, now U.S. Pat. No. 7,426,437, Ser. No. 11/778,127 filed Jul. 16, 2007, now U.S. Pat. No. 7,912,645, Ser. No. 11/874,418 filed Oct. 18, 2007, now U.S. Pat. No. 7,610,146, Ser. No. 11/874,732 filed Oct. 18, 2007, now U.S. Pat. No. 7,791,503, Ser. No. 11/874,749 filed Oct. 18, 2007, now U.S. Pat. No. 8,255,144, and Ser. No. 12/061,943 filed Apr. 3, 2008, now U.S. Pat. No. 8,260,537, and U.S. provisional patent application Ser. No. 60/062,729 filed Oct. 22, 1997, 60/123,882 filed Mar. 11, 1999, and 60/711,452 filed Aug. 25, 2005, on the grounds that they include common subject matter.

All of the above applications are incorporated by reference herein.

FIELD OF THE INVENTION

The present invention relates to systems and methods for universal tolling for use on infrastructure subject to tolling, such as roads, highways, bridges and tunnels, regardless of whether the infrastructure is publicly owned, privately owned or owned in combination by the public and one or more private entities.

More specifically, the present invention relates to a system, arrangement and method that are capable of determining tolls for vehicles on a multi-lane roadway whereby tolls for use of different lanes at the same general geographic point may be different.

BACKGROUND OF THE INVENTION

Vehicle owners or users are frequently assessed a fee for use of commonly or publicly owned infrastructure (as well as public or private infrastructure owned or managed by private entities) such as toll roads, bridges and tunnels. Such fees are typically referred to as tolls. The public is also often required to fund the development and maintenance of such infrastructure primarily through use of various taxes including, in particular, a tax on fuel. Significant inequities, however, occur because such taxes as the fuel tax are not paid by infrastructure users in proportion to their use of the infrastructure. For example, typically vehicles which have a greater fuel economy (than an average fuel economy) pay less and electric vehicles often pay nothing. Tolls which are collected at particular locations along a highway or at the entrance of a tunnel additionally only crudely tax vehicles in proportion to their use. Such tax collection and tolling systems are additionally expensive to implement and maintain, and can contribute to congestion on the nation's roadways as vehicles queue waiting to pay the toll. Because of these inequities and inefficiencies, there is a need for a ubiquitous and fair infrastructure charging system to eliminate the drawbacks of the current system.

One solution has been recently expressed in a book: "Many more things would become possible if the cloud knew the position of a car and its status. For example, road tolls could be collected virtually just by calculating the distance using the GPS data. There would be no need to construct costly toll-collection infrastructure. This way, things like toll collection would cease being a hardware thing and would become a software thing with all the benefits of software—lower costs, quicker upgrades, faster implementation, and ease of use. The last point is especially valid, because once hardware infrastructure is in place, it's much harder to make any changes if it proves to be user-unfriendly—it's much easier to tweak things with software." [Daniel Kellmereit and Daniel Obodovski, The Silent Intelligence the Internet of Things, www.thesilentintelligence.com].

A detailed discussion of additional background information is set forth in parents and published patent applications, for example, U.S. Pat. Nos. 9,053,633, 7,085,637, 7,110.880, 7,202,776, 7,672,756 8,260,537 and 9,528,834, all of which are incorporated by reference herein.

Electronic toll collection systems are described in U.S. Pat. Nos. 8,245,921, 8,587,484, 8,615,424, 8,660,890, and 8,843,390.

All of the patents, patent applications, technical papers and other references mentioned below and in the parent applications are incorporated by reference herein in their entirety. No admission is made that any or all of these references are prior art and indeed, it is contemplated that they may not be available as prior art when interpreting 35 U.S.C. §102 in consideration of the claims of the present application.

Possible definitions of terms used in the specification and claims are also found in the parent applications and/or related applications. Others are included herein.

OBJECTS AND SUMMARY OF THE INVENTION

An object of one or more embodiments of the present invention is to provide systems, arrangements and methods for universal tolling for use of infrastructure through use of automatic communication to a remote site for the purpose of recording use of such infrastructure and charging therefor.

In order to achieve this object and possibly others, a system and method is provided whereby vehicles are recorded as having used an item of infrastructure for which a toll is to be levied.

A system for tolling in accordance with the invention includes an accurate inertial and satellite or map-based location determining system arranged in a vehicle to accurately determine its location with reference to a map during vehicular travel, a memory device that stores accurate map data about predetermined locations, and a processor coupled to the location determining system and that compares the location of the location determining system to data in the memory device to determine whether a transmission of a vehicle identification (ID) and location information is necessary and if so, to direct the transmission to a remote site.

A communications device may also be arranged on the vehicle and coupled to the processor, and directed by the processor to send a transmission to the remote site. It is possible that the processor is resident in the communications device. The communications device may be configured to send an identification of the vehicle to the remote site. The communications device may also be configured to use a cellphone system when transmitting to the remote site and/or a direct Internet service provider when transmitting to the remote site and/or other suitable communication system. Alternatively, the communications device may be a portable device such as a smart phone.

The memory device and/or processor may also be arranged on the vehicle, i.e., to provide a completely vehicle-resident system that may be installed on the vehicle during manufacture or retrofit to the vehicle, or present in the invention. Generally, the term vehicle-resident as used herein may mean, for example, that the vehicle-resident memory device and/or processor are arranged on a or the communications device, e.g., a cell phone or smartphone, that is brought into the vehicle and removed therefrom with an occupant of the vehicle. Other vehicle-resident components would have the capability of being temporarily in the vehicle, or permanently in the vehicle.

Imaging devices may be arranged along roadways and in positions to monitor passage of vehicles by the predetermined locations. The imaging devices may comprise receivers configured to intercept transmissions from the vehicle to the remote site such that if a vehicle passes a predetermined location and does not transmit an identification, the imaging devices obtains an image of the vehicle for the purpose of an alternate toll charging method or to ascertain that the vehicle is attempting to avoid the toll. The imaging devices may additionally or alternatively be configured to process images to determine the presence of a towed trailer, whereby when the transmission does not include trailer information the imaging device obtains an image of a license plate of the towed trailer.

The predetermined locations in the memory device would typically relate to accurate mapped locations that require payment for use of infrastructure, such as a toll road, tunnel, bridge, parking facility, etc.

A more detailed system for tolling vehicles capable of travelling in multiple lanes of a multi-lane roadway in accordance with the invention includes at least part of a location determining system in each vehicle that determine the vehicle location at a plurality of different times during vehicular travel such that multiple locations are provided by the location determining system. The location determining system has an accuracy to be able to determine the specific one of a plurality of possible lanes in which the vehicle is located on a multi-lane roadway to thereby provide lane-specific location of the vehicle. A memory device stores map data including geographic points at which tolls are charged for use of the multi-lane roadway, and may be situated on the vehicle. A toll database includes data about tolls for use of a plurality of lanes of a multi-lane roadway at a plurality of different geographic points, the toll data can be different for different lanes of the multi-lane roadway at at least one geographic point. A communications device is situated on each vehicle.

A processor is coupled to the location determining system and the memory device and analyzes each determined vehicle location relative to the geographic points at which tolls are charged in the memory device. Also, the processor is coupled to or part of the communications device and based on the analysis of each determined vehicle location relative to the geographic points at which tolls are charged in the memory device, directs a transmission of the determined vehicle location by the communications device to a remote site separate and apart from the vehicle when the determined vehicle location coincides with or is a threshold distance of one of the geographic points at which tolls are charged.

Finally, a toll is determined at the remote site based on the toll database and the determined vehicle location transmitted by the communications device to the remote site which is the lane-specific location of the vehicle or based on at least two determined vehicle locations transmitted by the communications device to the remote site each of which is a lane-specific location of the vehicle.

The communications device also sends an identification of the vehicle or of the communications device to the remote site in or with each transmission of the determined vehicle location. In this manner, payment of the determined toll may be charged to an entity associated with the communications device.

A method for tolling in accordance with the invention includes arranging an accurate inertial and satellite and/or camera and map-based location determining system in a vehicle to determine its location during vehicular travel, comparing the location of the location determining system to data in a memory device to determine whether a transmission of the location is necessary, and if so, directing the transmission to a remote site via a communication system. Variations of the method include determining, at the remote site, distance that the vehicle has traveled since a previous transmission, or its use of a fee-required infrastructure, and calculating a toll based on the vehicle class and distance traveled or infrastructure use. An identification of the vehicle is sent to the remote site in or with the transmission. The toll may be calculated depending on the vehicle identification, and varied based on time of day, congestion, type of vehicle or value of a highway traveled or other infrastructure used.

Another method for tolling vehicles capable of travelling in multiple lanes of a multi-lane roadway in accordance with the invention includes determining location of a vehicle at a plurality of different times during vehicular travel using a location determining system such that multiple locations are provided, the location determination having an accuracy to be able to determine the specific one of a plurality of possible lanes in which the vehicle is located on a multi-lane roadway to thereby provide lane-specific location of the vehicle. A processor is used to compare each determined location to geographic points at which tolls are charged in a memory device that stores map data including the geographic points at which tolls are charged for use of the multi-lane roadway. Based on the comparison, a transmission of the determined location is directed using a communications device on the vehicle to a remote site separate and apart from the vehicle when the determined location coincides with or is a threshold distance of one of the geographic points at which tolls are charged. Then, a toll database is accessed to determine a toll for each vehicle based on the determined location transmitted by the communications device to the remote site which is the lane-specific location of the vehicle or based on at least two determined locations of the location determining system transmitted by the communications device to the remote site each of which is the lane-specific location of the vehicle. An identification of the vehicle or a smartphone present in the vehicle or owned by a driver or occupant of the vehicle is also sent to the remote site in or with each transmission of the determined location such that the vehicle owner or vehicle operator or smartphone owner is charged for the determined toll.

Other improvements will now be obvious to those skilled in the art. The above features are meant to be illustrative and not definitive.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIG. 4 is a schematic of a toll display in a vehicle showing tolls paid and upcoming tolls.

DETAILED DISCUSSION OF PREFERRED EMBODIMENTS

Figure 1:
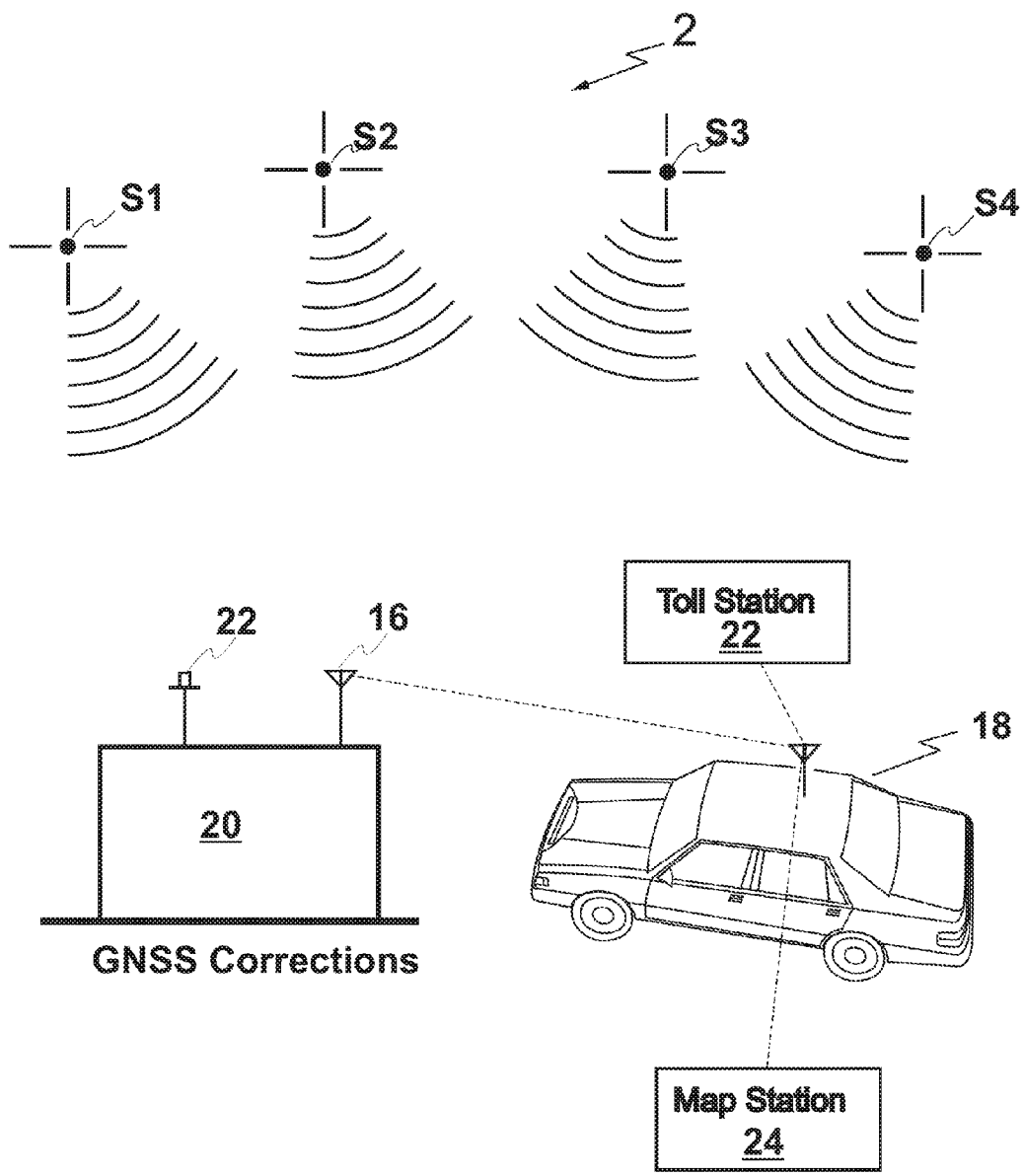
FIG. 1 is a schematic of a virtual tolling system using a ubiquitous communication system in accordance with the invention.

This invention preferably contributes to the solution of the general problem of permitting vehicles to move efficiently from one location to another, ideally without encountering congestion. It further preferably contributes to the solution of creating funds for construction and maintenance of roads and other infrastructure while attempting to minimize political issues. The principle is that users of infrastructure do not object to payment for use of this infrastructure as long as it is fair and permits orderly travel via the infrastructure without interruption. This invention preferably provides for payment for use of infrastructure in proportion to cost of that infrastructure. This payment is achieved without the addition of significant additional infrastructure related to toll collection. This invention further preferably removes the need for government subsidies or of any other taxes for use of infrastructure. Although provision is allowed for toll variability based, for example, on time of day or vehicle usage, the user can be informed through an in-vehicle display of the tolls charged and the tolling rate. If the destination has been identified by the vehicle operator, then the total tolls to that destination by one or more routes can also be displayed, e.g., on a common display screen or displayed projection. The user thus is provided an option to select one of a plurality of different routes based viewing the total tolls for all of the routes.

An objective of this invention is preferably to assess tolls to infrastructure users based on construction and maintenance costs of the facility. If the facility becomes congested, then additional infrastructure can be constructed from the tolls received without the need for government intervention. Private companies can be solicited to solve the congestion problem at a particular location with the cost of developing the new infrastructure paid for out of tolls collected on the current and new infrastructure.

This tolling method is facilitated by the knowledge that a particular vehicle is traveling on a particular road lane and is tolled based on the location of the vehicle. This requires that the vehicle know its location with sufficient accuracy and that a resident map on the vehicle is also sufficiently accurate that the vehicle can ascertain that it is occupying a particular lane on a particular road. Thus, as is now the case in some locations, adjacent lanes can be tolled at different rates. An express lane, for example, which permits high speed travel due to fewer vehicles using this lane can be adjacent to a free or lower cost lane having a higher vehicle density. This is facilitated by the vehicle location determining system comprising a satellite GNSS system coupled with an inertial measurement system (IMU). The GNSS system provides information for correcting drifting errors in the IMU and the IMU is used to continuously locate the vehicle. In most embodiments, the satellite GNSS system and the IMU are both located on the vehicle.

Additionally, a vehicle-resident map similarly is sufficiently accurate, with lane-specific geographic point data, that from the combination of the vehicle location system and the vehicle map, the location of the vehicle relative to the map is known or determinable with sufficient accuracy that the lane upon which the vehicle is traveling is not in doubt. The lane-specific vehicle-resident map may reside in a database on the vehicle or off of the vehicle, yet accessible by a processor on the vehicle. This processor obtains or determines the location of the vehicle from the data from the GNSS system and the IMU and accesses the map data in the database in order to derive the location of the vehicle relative to the map.

The tolling system of an embodiment of this invention does not require the addition of tolling infrastructure, and the toll rate and the infrastructure tolled can be arbitrarily changed as the need for funds to create new infrastructure changes. Similarly, the toll rate can be changed as a function of the time of day and/or congestion level, for example, and the tolls for alternate routes to the vehicle's destination can be displayed permitting a vehicle to take a longer but lower tolled path to its destination if so desired by the vehicle operator. Similarly, a vehicle operator can establish his or her priorities as to the time of the trip and the path to be taken as a default, and the system can automatically determine the proper route consistent with the owner's priorities.

Initially, this system can work in parallel with existing systems and some of the advantages of this system will therefore not be available. For example, if it is decided to toll a new section of the roadway without adding additional toll collection infrastructure, this cannot be done until prior systems have been discontinued. All new cars can be manufactured with the appropriate resident hardware for this system and eventually as vehicles periodically re-register, the retrofit hardware can be installed on existing vehicles. For the case where a smart phone is used as the communications device, the on-vehicle hardware can be minimal. Since there is no additional toll infrastructure cost required, this system can become ubiquitous quickly.

This system potentially permits all elements of the infrastructure to be tolled including highways, bridges, tunnels and even city streets, rural roads and private roads. To control congestion in Manhattan, for example, it may be desirable to toll use of city streets. The cost of adding capacity to a street in downtown Manhattan is obviously very high. Nevertheless, adding a second layer to a street or a bypassing tunnel may be justified and the users may be willing to pay a toll to create such an infrastructure expansion if given the opportunity. Such an opportunity does not now currently exist and thus everyone suffers from massive congestion in downtown Manhattan from time to time. Similarly, funds are needed to maintain and construct rural roads and therefore since the tolling infrastructure cost is minimal, this system permits the accumulation of funds for constructing and maintaining such rural roads. Based on the usage and tolls collected, the quality and quantity of rural roads can be automatically adjusted to meet the needs of users without the imposition of special taxes.

Finally, the widely considered unjust fuel tax can be eliminated and vehicles can be tolled based on the damage that each vehicle causes to the roadway. A heavily loaded truck, for example, can cause damage of 10 or 100 times or more than that of a passenger vehicle and the toll charged can be so adjusted. The damage to a roadway is a function of, among other things, time, vehicle load, weather and the design of the road. Some roads are designed to deteriorate within a few years of their construction whereas others last for 40 or more years. Since the tolls to be charged on a given roadway will depend on the maintenance and construction costs, the choice of road design can depend on these factors. A road which is known to be heavily used by loaded trucks, can be designed to be much thicker and thus to last longer due to its ability to handle more heavily-loaded vehicles without significant deterioration. These calculations are not done now and as a result some roads are in poor repair one or two years after they are put in service. The cost of building and maintaining poorly designed roads obviously greatly exceeds the cost of building and maintaining well-designed roads in some areas. By allocating the design, construction and toll collection to private companies, the proper design of roadways will be improved reducing congestion and the infrastructure cost as the responsible companies attempt to maximize their income.

FIG. 1 shows a schematic of a vehicle 18 interacting with a GNSS satellite system 2, a GNSS corrections system 20, a toll collection station 22 at a fixed geographic location (e.g., proximate infrastructure), and a map station 24. The vehicle 18 has a map of the area surrounding its driving location which can reside on the vehicle 18 or on a smart phone, e.g., in a database or memory component on the vehicle 18 or smart phone. This map accurately represents the lanes upon which the vehicle 18 is traveling to an accuracy measured at the centimeter level, or otherwise sufficient to enable the location of the vehicle on a specific lane of the road to be determined Creation of such a map is described in, for example, U.S. Pat. No. 9,528,834, or it may be created by another appropriate method.

The vehicle-resident map can be automatically updated from time to time when the infrastructure has changed. To this end, the vehicle includes a processor with an update engine that periodically communicates with a remote source of map data and assess whether the current map data on the vehicle is current with the remote source of map data, e.g., the date of the version of the vehicle-resident map data is the same as the date of the map data at the remote source. If not, the processor initiates a data transfer of map data from the remote source to update the map data in the memory component or database of the vehicle.

Vehicle 18 also receives GNSS signals from satellites 2 represented here as S1, S2, S3, S4. Vehicle 18 may receive and process signals from four or more satellites. GNSS corrections station 20 similarly receives signals from the same satellites 2 and through one of a variety of known processes, determines the corrections to the GNSS signals from satellites 2 and communicates these corrections to the processor on the vehicle 18 that is using signals from the GNSS satellite 2 to determine vehicle location. Although there are errors in the signals from satellites 2, these errors can be corrected on the vehicle 18 and thereby the vehicle 18 can determine its accurate location.

Since the vehicle 18 can travel many meters between satellite signal acquisitions and the calculation of its location therefrom, the vehicle 18 cannot rely on these calculations to determine its precise location at the current time. Instead, the location calculation at time T, for example, is determined through use of an inertial measurement system (IMU) which keeps track of the location of the vehicle at all times. The IMU, which can be based on MEMS technology, however loses accuracy over time and must be corrected, which is done by the position calculations based on the GNSS signals described above. Depending on the satellite error correction method, the GNSS position-based determination system accuracy can vary from less than about 2 cm to approximately 10 cm one Sigma. With the expected accuracies of the inventive vehicle location determining system and maps, the vehicle will know with very high accuracy and lane upon which it is traveling. This capability is likely to be highly desirable for the implementation of the ubiquitous tolling system of this invention to minimize tolling errors.

Fixed, geographic points for triggering a toll charge in this implementation exist on the maps resident on the vehicle 18 and when the vehicle 18 determines that it is passing such a triggering point (i.e., a processor on the vehicle 18 compares the current location to the points on the map in the database or memory component and finds that they coincide or are within a threshold distance of one another), a message is sent from the vehicle 18 to the toll station or administration 22 by any of several convenient wireless networks using a communications system on the vehicle 18. This wireless network may be that used by the cell phone system, in others, it is an Internet Wi-Fi system and still in others, a DSRC transceiver is placed on the roadway for this purpose. Any appropriate wireless network can be used.

In FIG. 1, map station 24 represents a geographic point at which tolls are charged for use of a multi-lane roadway. The geographic point might be any point along the roadway, e.g., an exit or entrance to the multi-lane roadway, entrance or exit to a bridge or tunnel, etc. A memory device is thus provided in the vehicle with a map database including data about the geographic points.

An important aspect of an embodiment of the invention is that the geographic point is not lane-specific. Rather, the geographic point covers a general area encompassing multiple lanes of the multi-lane roadway. The geographic point may thus, in some embodiments, be defined as the entrance of a multi-lane roadway to a bridge or tunnel. The geographic point is not a point in a particular lane of the multi-lane roadway. As such, knowledge of the vehicle being at or passing a geographic point does not convey the particular lane in which the vehicle is in on the roadway, in some embodiments.

Toll station 22 preferably includes a toll database including data about tolls for use of a plurality of lanes of a multi-lane roadway at a plurality of different geographic points. Toll station 22 also houses or encompasses a toll determination and collection system, described herein. The toll data is different for different lanes of the multi-lane roadway at at least one geographic point. Thus, retrieval of toll data from the toll database at the toll station 22 for the purpose of determining a toll for a vehicle is activated when the vehicle passes the geographic point, but the actual toll is determined by reference to the vehicle's lane-specific location (and access to the toll database which contains, for example, a table of the lane-specific tolls at each of the geographic points).

For example, a table of toll data in the toll database at the toll station 22 may appear as follows:

| Geographic point | Lane | Toll |
|---|---|---|
| 1 | 1 | $1.00 |
| 1 | 2 | $2.00 |
| 1 | 3 | $3.00 |
| 2 | 1 | $1.00 |
| 2 | 2 | $2.00 |
| 2 | 3 | $3.00 |

The determination of the need to pay a toll is thus based on the passing of the vehicle by a geographic point in the map data stored at the memory device on the vehicle, i.e., a map station 24. The toll however is not determined at this point, but only after and in response to, the direction of a transmission to the toll station 22 by the communication device on the vehicle (see FIG. 3 discussed below). Additional factors may be used at the toll station to compute the toll, as opposed to simply the passage of the vehicle by the geographic point and by deferring toll determination to the remote site, it becomes possible to introduce adjustments to the toll based on for example, the time of day, the nature of the vehicle, congestion, and the like. Adjustments may also be based on data from other sources that is directed to the toll determination and collection system at the toll station 22. This data may be about road conditions in advance of the geographic point.

Figure 2:
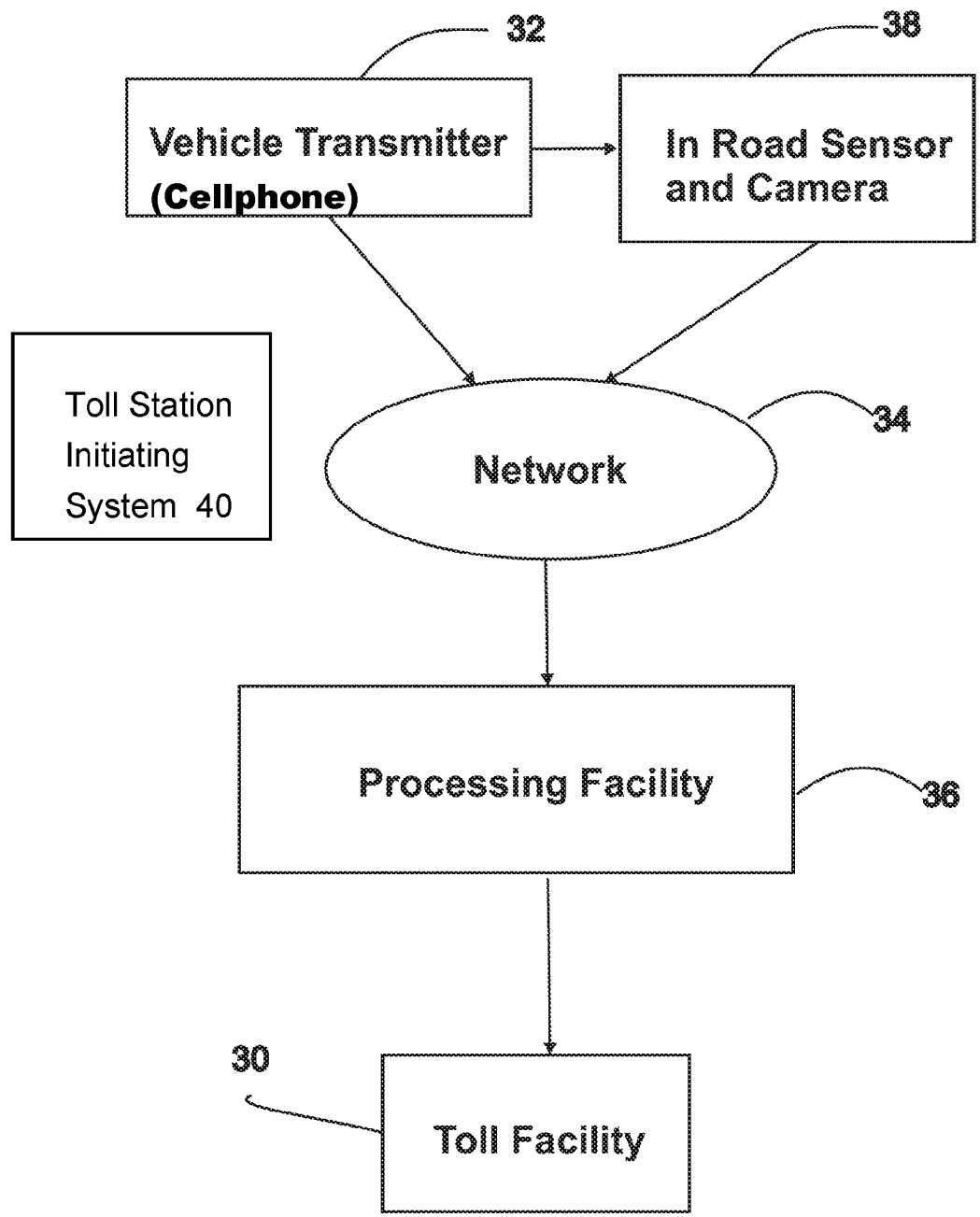
FIG. 2 is a schematic showing one manner in which an indication of payment for a toll from a vehicle is generated.

Referring to FIG. 2, a technique in accordance with the invention replaces conventional toll collection systems, such as toll booths, and local tag interrogator transponder systems, such as the EZ-Pass, I-PASS or EZ-Tag system, with a vehicle-resident wireless transmitter 32 which, when triggered by the vehicle in which the transmitter 32 is located passing a toll location marked on the vehicle-resident map, sends a message containing an identification of the vehicle to a remote processing facility or site 36 via a wireless network 34, which can comprise or be the Internet. This can be accomplished either through the cell phone system or through a direct connection with an internet service provider (ISP) or road-resident DSRC transponder or equivalent.

The vehicle-resident wireless transmitter 32 is used to provide information to enable toll determination and/or collection. Information about the vehicle, such as its identity and location, is transmitted via the vehicle-resident wireless transmitter 32 to an off-vehicle location, such as remote processing facility or site 36, to be processed into an indication of a toll due for the operator or owner of the vehicle and means for effecting collection of this toll, such as by charging an associated account of the operator or owner for the toll. Accomplishing this through the cell phone system allows the user's cellular (cell) phone itself to be the vehicle-resident wireless transmitter 32. That is, the user's cell phone is configured with appropriate software and hardware to detect reception of a wireless signal from a toll station initiation system 40 and after and based on such reception, generate and send a responsive signal indicative of, for example, the identity of the vehicle. The cell phone is considered an example of an intelligent communications device, which also includes, for the purposes herein, a smartphone and the like, and thus mention of a call phone includes a smartphone.

A processor may be included as one of the hardware components and perform the functions of any of the processors, processing units or the like disclosed herein. For example, the cell phone may include a computer program product that is configured, when executed to detect reception of a tolling gantry-emitted signal and then generate and cause transmission of a response via the cell phone and a network, potentially using the Internet, through a communication system that the cell phone is configured to use. The response forms the basis for charging the vehicle for the toll. It is possible to integrate such a cell phone into a rear-view mirror, e.g., the rear-view mirror in the passenger compartment typically mounted to the A-pillar or the front windshield.

Information transmitted in the signal from the cell phone upon initiation by the toll station initiation system may include location information about the vehicle and specifically, lane-specific location information. This may be useful when a tolling location has different tolls based on the lane in which the vehicle is travelling and the specific lane in which the vehicle is travelling cannot be determined from a responsive signal containing only the vehicle's identity. Initiation of the cell phone to transmit its identification alone is not sufficient to enable the tolling facility to determine the required toll when there are different tolls for different lanes covered by the toll station initiation system, and thus the cell phone would also have to be a conduit for lane-specific location information about the vehicle.

This is particularly useful when the toll station has multiple lanes all of which are designed to have vehicles travelling to generate a signal in response to tolling gantry-emitted signals without different signals being transmitted for respective lanes. As such, the only way to determine the toll for a vehicle travelling in a multi-lane road past a common tolling station would be for the vehicle to transmit its lane-specific location via the cell phone. However, this embodiment, and the other embodiments disclosed herein, may also be used when different lanes have different toll gantries, i.e., each toll gantry covers only one lane, and thus the lane in which the vehicle is located is determinable based on its response to a tolling gantry-emitted signal alone. Other techniques for a vehicle to know or determine what lane it is in by a method other than accurate maps may thus be implemented in the invention, including but not limited to the technique wherein the vehicle knows its lane-specific location since the signal from the gantry only covers the lane occupied by the vehicle.

Moreover, this embodiment allows for the charging of the toll to the owner of the cell phone, regardless of the vehicle in which the owner is located. The owner can thus activated their cell phone and use it in whatever vehicle they are using, e.g., a rented or borrowed vehicle. As such, renters of cars would be able to use their cell phones to pass by tolls without renting additional tolling devices, such as Plate-Pass™.

Marking of the toll location on the vehicle-resident map may mean that the vehicle includes a vehicle-resident map contained in a database or memory component or has access to a map contained in an off-vehicle database or memory component, and this map contains an indication of a location of a toll. This location may be, for example, longitude and latitude of the toll.

A toll determination and collection system may be situated at the processing facility 36, as well as a toll database of tolls for specific lanes of the multi-lane roadway, or at a separate toll facility 30. The toll determination may be performed at the processing facility upon access to the toll database while the toll collection may be performed by the toll facility 30. Toll collection typically entails associating the identification of the vehicle with the manner in which the toll is to be paid and then charging the vehicle owner for the toll.

Implementation of this system does not require any road-based infrastructure investment other than enforcement road-embedded vehicle sensor and camera systems 38. If the vehicle is sensed by an embedded vehicle sensor of the system 38 and the transmitter 32 and the vehicle fails to send a message containing its identification to the remote processing facility 36, then a picture of the vehicle and its license plate can be obtained by system 38 resulting in an alternate tolling method for vehicles which are not equipped with the system or enforcement for toll violators who may have prevented the transmission. The in-road sensor and camera system 38 preferably sends an image of the vehicle to the network 34 if a transmission from the vehicle's transmitter 32 is not sensed.

Figure 3:
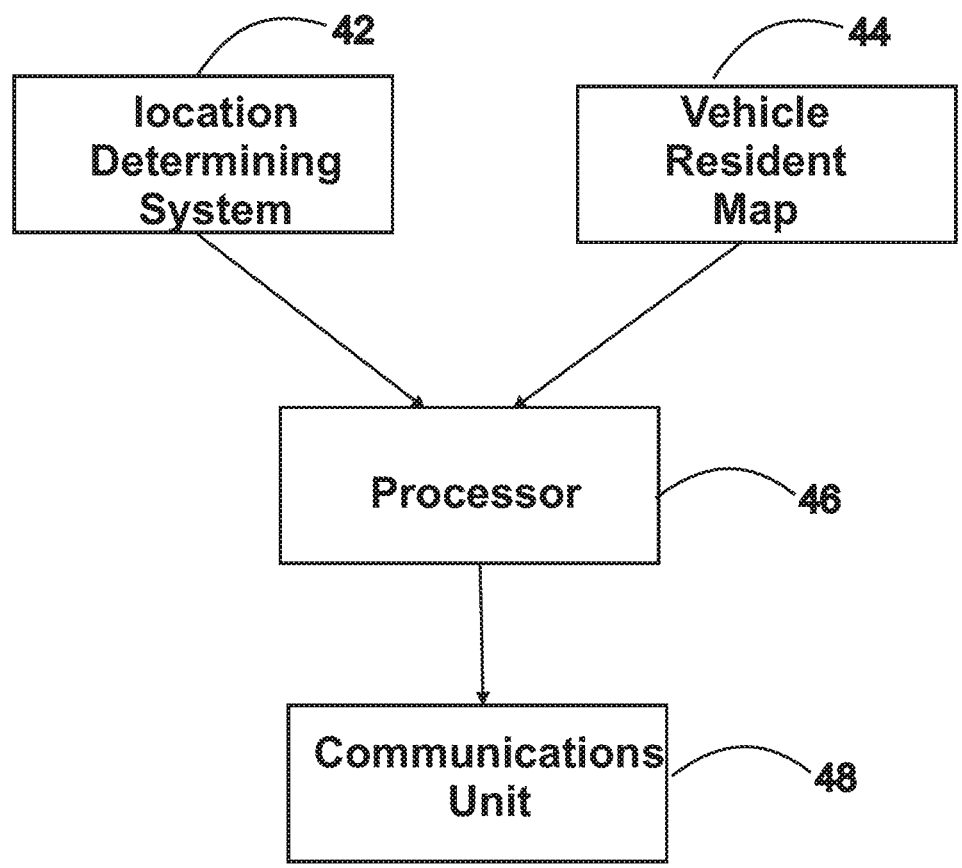
FIG. 3 is a schematic of an automatic vehicle-based tolling system.

To illustrate one implementation of this invention with reference to FIG. 3, a vehicle has a device 42 which monitors its location based on, for example, a differentially corrected GNSS receiver and an IMU (as described above with respect to FIG. 1). The location of the device 42 is considered the location of the vehicle. Location determining system 42 may be situated entirely on the vehicle or only partly on the vehicle, with the remainder remote from the vehicle. Any location determining system may be used that is available to provide an accuracy of the location determination as needed herein, i.e., lane-specific accuracy. The location determining system 42 may determine the location of the vehicle instead of its own location, e.g., when not entirely on the vehicle.

With the location determining system 42, the vehicle knows where it is at all times with sufficient accuracy that it can place itself on a particular lane, including on a vehicle-resident map 44 that may be displayed to the driver of the vehicle. When the vehicle passes a particular geographic point or location (map station 22), which may be determined by a processor 46 comparing the current vehicle location (the location of device 42), and preferably with sufficient precision to include possibly the actual lane on a multi-lane roadway it is travelling on, to locations stored in a memory device containing the vehicle-resident map 44, it automatically transmits its location via communications unit 48 to a remote site via a network which may include the Internet, e.g., via the processor 46 directing the communications unit 48 (of which the processing unit 46 may be part of or integrated with or into). The remote site may be the toll station 22, see FIG. 1, which contains a toll determination and collection system.

The memory device including the vehicle-resident map 44, which represents one or more memory components or data storage devices, and optionally associated hardware and/or software to enable access to and retrieval of information from the map 44, may be arranged entirely on the vehicle, only partly on the vehicle and partly on a smart phone, or partly at one or more remote, off-vehicle locations or entirely off-vehicle. For example, the memory device 44 may be in the "cloud" thereby saving storage on the vehicle. In general, however, it will preferably be located on the vehicle or smart phone covering the area in the vicinity of the travel location of the vehicle. Such a map 44 can be updated periodically as changes obsolete some portion of the map 44. Any map-updating program or technique may be used in the invention. If partly or entirely located off of the vehicle, map data may be transmitted to the vehicle for the location comparison.

When a toll is distance based or infrastructure based, hardware and/or software at the remote processing facility or site, e.g., element 36 in FIG. 2, determines the distance that the vehicle has traveled on the highway since its previous transmission, or its use of another particular infrastructure such as a bridge or tunnel, and calculates a toll based on that distance traveled or infrastructure use. When the vehicle has completed its trip, or at some other convenient time, software at the remote site (e.g., toll station 22, processing facility 36, and/or toll facility 30) can calculate a toll based on the usage by the vehicle of the highway or other infrastructure. The charging rate can depend on the vehicle ID which identifies its class, the time of the day, congestion encountered and/or the value of the highway or other infrastructure used. This ID information, along with information about the time, congestion, and road value, may be transmitted by the transmitter 32 on the vehicle or obtained by the remote processing facility 36 from one or more other sources.

The information may be predetermined by the toll operator, e.g., a toll during peak hours in workdays is X amount of money while a toll at other times is Y amount of money. The information may also be transmitted separately to the remote processing facility 36, e.g., cameras may be provided to view roadways and enable a processor at the remote processing facility to determine congestion based on the images and use the determined congestion to price the applicable toll.

A large truck, for example, will be charged more than a passenger car which also will be charged more than a motorcycle. Vehicles traveling during rush hour, or when the road is congested, can be charged more than vehicles traveling during times when the highway is less used. Vehicles traveling on highways located over rivers or in downtown cities can be charged more than vehicles traveling on rural roads.

Implementation of the device in the vehicle can take many forms. New vehicles, for example, can come equipped with a minimal system comprising a GNSS receiver, memory, processor and network communication system, when the smart phone communication system implementation is not used. Various predetermined geographic locations can be identified, and stored in a memory device containing the vehicle-resident map 44, such that when the vehicle passes such a location, it will transmit its ID and other relevant information to the network using the communications unit 48. The receiving location or remote site will monitor vehicle positions over time, i.e., at separated times, and when transmissions cease, indicating the end of a trip or at some other appropriate time, it will calculate a toll and deduct the amount from an account of the vehicle owner or otherwise arrange for payment.

Payment can be arranged through an account maintained at the tolling administration which is replenished in a conventional manner, e.g., from a direct bank transfer, a credit or debit card, PayPal, iPay or equivalent or other appropriate payment system which can depend on the country where the system is installed. The payment method can be controlled by the smart phone making this system usable in multiple jurisdictions such as cities, states and countries. One system can thus be used worldwide.

Imaging devices such as cameras as part of the in-road sensor and camera system 38 can be installed periodically on and/or along the roadway to monitor the passage of vehicles by the predetermined geographic tolling locations (see FIG. 2). Such cameras can also contain signal receivers which can intercept the vehicle-to-remote site transmissions. If a vehicle passes such a predetermined geographic location and does not transmit a vehicular identification to the Internet, the camera can photograph the vehicle for the purpose of an alternate toll charging method or to ascertain that the vehicle is attempting to avoid the toll. The toll charged for the alternate system can be higher so as to motivate the vehicle driver to use the system of this invention.

In the case of existing vehicles, the system (comprising the location determining system 42, vehicle-resident map 44 and processor 46 either as a single, integrated unit in a common housing or otherwise, along with a communications unit 48 coupled to, integrated into or part of this unit) can be retrofitted onto the vehicle in much the same manner as toll tags are retrofitted now. For example, vehicles currently using toll tag transponders can be required to affect the substitution. Vehicles which do not immediately implement the retrofit system can be tolled using license plate recognition cameras as is now done in some locations until their vehicles are retrofitted. The tolling rate for such vehicles can be higher to incentivize the implementation of the retrofit system, however, since the tolling locations cannot be increased until all vehicles are part of the system, it is likely that implementation will be mandatory after some time period. There will of course be the requirement that all vehicles maintain a camera-readable license plate as is already a requirement in some locations. Those license plates that violate this requirement can be identified through cameras and the proper authorities immediately alerted.

Once this system is completely implemented, all current tolling stations can be eliminated. This may substantially reduce the cost of tolling in that toll collectors and tolling booths will no longer be necessary. It may also facilitate the elimination of the gasoline tax and thus the immediate reduction in the cost of gasoline. Since the vehicle-resident transmitter 32 will know the nature of the vehicle, trucks can be preferentially tolled over cars and cars over motorcycles. Vehicles pulling trailers can be charged for the vehicle and the trailer. Trailers now are required to have valid license plates so it would not be unreasonable to require such trailers to also have retrofitted systems which transmit their ID to the vehicle communication system for transmission to the tolling authority when a toll is required. In this case, infrastructure-mounted cameras can process images using, for example, pattern recognition software either associated with the camera or at a remote site to determine the presence of a towed trailer and if that information is not transmitted, the trailer license plate can be recorded. Infrastructure-mounted cameras include cameras mounted on poles and the like alongside or over a roadway.

Various enhancements can be effectuated using smartphone-like applications such as determining in advance the cost of a trip when the operator enters his destination based on the trip from the current location to the destination. Various alternatives can also be presented such as what that cost would be if the owner chose a different route or time of day or chooses to be routed around congestion. These additional features can of course also be implemented in new vehicle systems as well as retrofitted systems. They can be displayed on a display or otherwise notified to the vehicle owner or operator through his or her smart phone (visually and/or orally). The system can therefore include applications that calculate tolling charge and offer route alternatives and alert the operator of the vehicle of charges for use of the infrastructure.

Initially, the current toll tag system will need to operate in parallel with the new system. Thus, vehicles can pass the tag interrogator locations freely as long as there is a connection between the toll network and the transponder. In this case, the tag interrogator will ignore the vehicle. For early adopters, the tolls charged to the vehicle operator can be reduced by an amount appropriate to incentivize adoption. Shortly thereafter, it is expected that the gasoline tax will be removed and all other tolls increased proportionately. This may result in a windfall for those not traveling on tolled infrastructure until the entire system has been implemented on all roads. Alternatively, the total miles traveled can be periodically uploaded to the toll system and form a base charge upon which special tolls are added when the vehicle uses a tunnel, bridge or express lane. Thus, an alternative version of the system can require that the odometer readings of the equipped vehicles also be transmitted thereby minimizing the number of predetermined geographic locations where tolling is implemented and where cameras are required.

Whenever a vehicle passes a predetermined geographic location, the miles traveled by the vehicle can be recorded and the change in miles traveled from the last transmission can be used to determine the required toll. In such cases, it can be assumed that the tolls would be based on the non-congestion time of day rate. Alternatively, a transmission by the vehicle-resident transmitter can be programmed using software and/or hardware associated with the transmitter to occur whenever the odometer records a change of a predetermined incremental mileage such as 100 miles. This incremental mileage determination can alternatively be calculated using GNSS readings. The odometer may be coupled to a processor and the vehicle-resident transmitter and configured to provide a signal or mechanical operation whenever 100 miles are travelled.

FIG. 4 illustrates a display which can be implemented in an equipped vehicle, i.e., on a display screen in the vehicle, and/or on a smart phone providing a record of tolls paid so far during the trip and to be paid for the remainder of the trip, assuming that the operator has entered his/her destination into the system. Toll reducing suggestions can also be provided on the display. In a preferred implementation of the system, a display will be provided in the vehicle and/or smart phone which will provide the current rate being charged, i.e., or more generally details about the rate such as per mile, per hour, and the like, as well as the total charges so far on a particular trip. In this manner, the vehicle driver will not be surprised when the bill later arrives. Additionally, the system can alter the tolls for different paths to enable the user to change their path to an alternate in order to relieve congestion if so desired.

Several implementation strategies can be considered. Since this system does not require addition of any fixed infrastructure, it can be set up on a regional or national basis, once all vehicles have the appropriate maps, hardware and software on board. Prior to its implementation, the existing tolling systems can remain in place. The system can be extensively tested without actually assessing tolls until all of the bugs have been worked out. Under this scenario, where implementation is done everywhere at once, the existing tolling systems can be totally replaced by the new system overnight. In spite of best efforts, there still may remain numerous vehicles without a properly functioning system.

Figure 5:
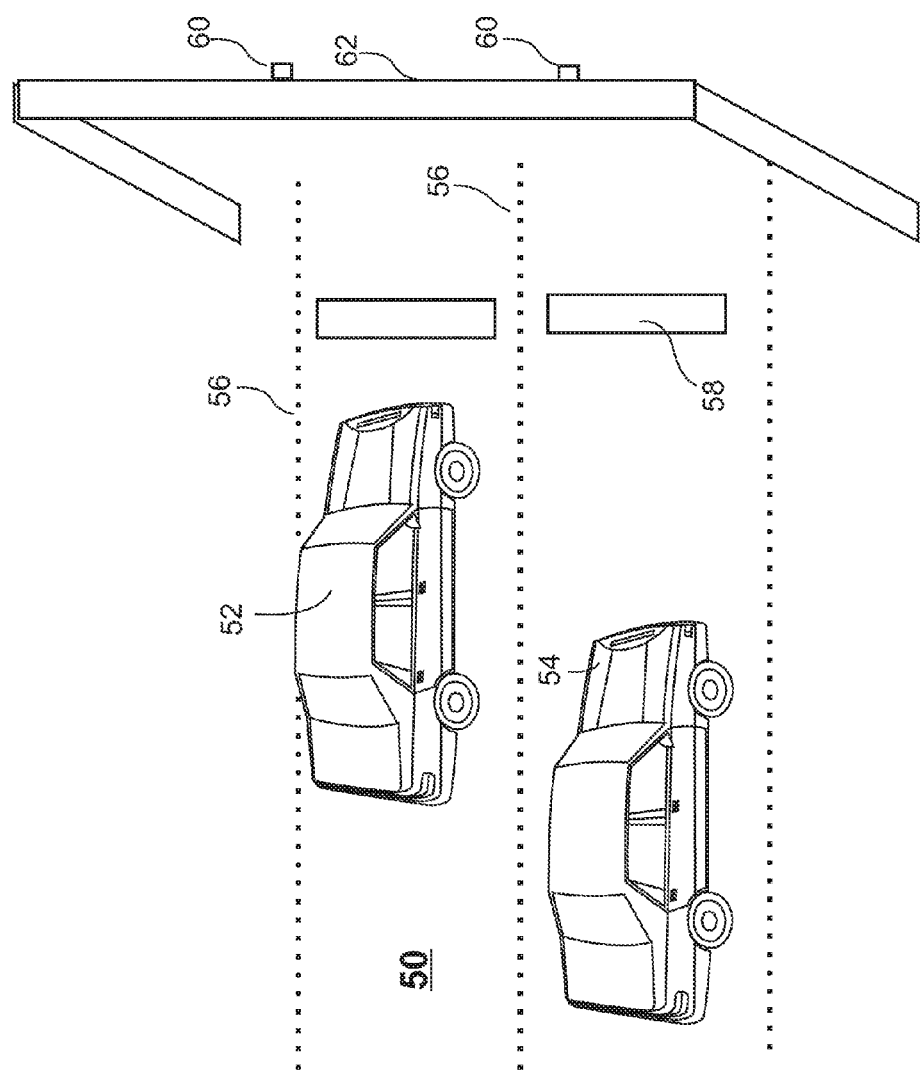
FIG. 5 is a schematic of vehicles on the road with sensors in the road to detect the passing of a vehicle and a gantry with car transmission receivers and cameras to photograph vehicles which do not make toll ID transmissions.

In order to help identify such vehicles, a few photographic stations may be required such as illustrated in FIG. 5. In FIG. 5, vehicles 52 and 54 are approaching in-lane sensors 58 which detect the presence of vehicles and at the appropriate later time, cameras 60 acquire a picture of the rear of the vehicle and its license plate. This is accomplished by cameras 60 which are mounted on gantry 62. Vehicle 52 is shown in lane 50 having lane markers 56.

Similarly, if a vehicle operator intentionally attempts to avoid paying a toll by preventing a transmission to the network, this system will record the license plate of a vehicle which fails to transmit an ID code to the network. Thus, the cameras 60 also contain signal receivers which record transmissions from the vehicles 52 and 54. Alternatively, the cameras 60 may be associated with signal-receivers, e.g., mounted alongside or proximate the cameras 60 and possibly on the same gantry 62. As such, element 60 may be generally considered a camera and receiver assembly If a vehicle crosses the vehicle detectors 58 and simultaneously transmits its ID to the network, this will be sensed by the camera and receiver assembly 60 and a picture need not be acquired of the vehicle license plate. This system can also be used to verify that trailer information has been part of the vehicle transmission. Otherwise, the camera and receiver assembly 60 will be provided with the detection of the presence of a vehicle by the vehicle detectors 58, but not detect a transmission from the vehicle's communications unit. In this case, the camera and receiver assembly 60 will obtain an image of the vehicle. The speed to perform the vehicle detection by detectors 58, determine whether the signal receiver portion of the camera and receiver assembly 60 detects a signal from the vehicle transmitter and obtain an image may be milliseconds or less since the vehicle may be travelling at cruising speed.

Naturally, there will be many attempts to game the system and it will take time to eliminate all of the anomalies and other issues and ultimately result in a fair and balanced tolling system that generates sufficient revenues to maintain the existing infrastructure and create required new infrastructure. Since the tolls may be based on the replacement cost of the infrastructure, the users may become sensitized to the cost of such replacement and will be motivated to become involved in determining what infrastructure is constructed and by whom. Since use of union labor, for example, generally increases the cost of such infrastructure construction, users may be motivated to insist that the government allocate contracts to the lowest bidders regardless of union labor use since it will immediately and directly affect their tolls.

The particular communication protocol used by the system, i.e., the vehicle transmitter 32 as shown in FIG. 2 or the communications unit 48 shown in FIG. 3, to communicate with the tolling administration can be any text-based system such as SMS or equivalent.

Since the system will be aware of the physical location of every vehicle as it interacts with any tolling location, the location of a stolen vehicle can be readily determinable thus inhibiting such thefts. Also, since the vehicle location will be determinable as it interacts with any tolling location, programs can be implemented which will notify interested parties when a particular vehicle travels outside of a chosen geographical area, also known as geo-fencing. Thus, parents can keep better track of their teenagers and trucking companies of their cargo.

The system described above can also be used for other "tolling" situations such as payment for parking and entrance to sports arenas, or other secured places.

In most cases, it is sufficient to know the road on which the vehicle is traveling, however, in cases where there are adjacent tolled lanes to non-tolled lanes, then the particular lane on which the vehicle is traveling must be determinable. In most cases where such lane combinations exist, the tolled lane can only be entered at discrete points and therefore there are many opportunities for determining the lane being used by the vehicle with the system of this invention. For the case where the tolled lane is not walled off, the determination of the traveled lane requires an accurate system for locating a vehicle and an accurate map.

The preferred mapping system for use with this invention comprises a number of probe vehicles which periodically acquire pictures of the environment surrounding the vehicle. Each probe vehicle contains an accurate GNSS satellite receiver for receiving, processing and correcting the satellite signals. Since these signals are diffracted as they pass through the atmosphere, resulting in an unknown path length, significant errors can result in a position calculation based solely on these satellite signals. Several techniques are commonly used to correct these errors and can be broadly separated into wide area differential GNSS and local area or RTK differential GNSS. Without going into detail, RTK is usually capable of one Sigma accuracies of less than 1 cm whereas wide area differential systems are typically accurate to about 10 cm. The probe vehicles record the location and pointing direction of their camera(s) which is transmitted to the processing site along with the taken pictures where maps are constructed using this information. A more detailed explanation of this process can be found in U.S. Pat. No. 9,528,834. The resulting maps locate road and lane boundaries to substantially better than 1 m accuracy and the system has the capability of achieving centimeter level accuracy.

Each equipped vehicle will also contain an accurate GNSS receiver which with the appropriate software can also locate the vehicle to within 10 cm or better, one Sigma, depending on which correction system is used. The satellite-based locating system, however, is only available once every second and a vehicle can travel many meters in one second. An additional location device is therefore preferably present in the system and used to actually determine the location of the vehicle for lane identification and other location purposes. This device is called an inertial measurement unit (IMU). It typically consists of at least three accelerometers and three gyroscopes. Since these devices are made from silicon using micromachining techniques, their measurements drift over time and must be frequently corrected. This is done using the position determining measurements from the GNSS satellites. The combination of the maps and the vehicle-resident location system yields and accuracy of greater than 99.99% that the lane upon which the vehicle is traveling corresponds to the lane on the vehicle-resident map. This is based on one measurement. The longer that the vehicle resides on the particular lane, the more such calculations can be made and the error rate rapidly decreases to near certainty after a few minutes. Thus, the risks of miss-tolling are minimal using the system of this invention with the accurate maps of the above-referenced mapping patent application.

To achieve these accuracies requires that the GNSS receiver and IMU be mounted at a fixed and known location on the vehicle. Thus, although such devices are available in some smart phones, either the smart phone must be mounted and oriented at a fixed and known location in the vehicle or these devices must be a permanent part of the vehicle. Also since smart phone IMUs and GNSS receivers may not have the required accuracies, a preferred implementation of this invention uses a vehicle-mounted IMU and GNSS receiver.

There has been expressed a great deal of concern of a system which depends upon the availability of the GNSS signals due to the ease with which these signals can be jammed, spoofed, or otherwise made not available. Using the map system described above those vehicles which are equipped like the probe vehicles, that is they contain accurate cameras, can also determine their location even more accurately than from the GNSS signals using wide area differential corrections based on the maps and pictures. There are some areas where differential corrections are temporarily or permanently not available and a map-based location system is required. This is available now for the first time using the teachings of this invention.

A derivation of the accuracy of the vehicle lane location follows.

Probability Analysis of the Vehicle's Lane Estimation

Assumptions:
1. The vehicle moves in one lane and its tires do not cross over into another lane. All errors of lane location estimation arise due to estimation errors (the accumulative action of errors from the device's sensors and map data).
2. The vehicle is considered to be located at any lane if its center is estimated at that lane.
3. The errors of estimated vehicle location are distributed in accordance with the normal (or Gaussian) distribution.

Background Theory:

The probability density function of the normal distribution with the mean value $\mu$ and the standard deviation $\sigma$ is as follows $$\cdot f(x) = \frac{1}{\sigma\sqrt{2\pi}} e^{-\frac{(x-\mu)^2}{2\sigma^2}}. \quad (1)$$

The cumulative distribution function (CDF) of any continuous random value X is the function given by $$F(x) = P(X \leq x), \quad (2)$$

where P is the probability that the random variable X takes on a value less than or equal to x.

CDF is expressed as the integral of the probability density function:

$$F(x) = \int_{-\infty}^{x} f(t) dt. \quad (3)$$

For the normal distribution, CDF can be calculated through two related special functions $$F(x) = \Phi\left(\frac{x-\mu}{\sigma}\right) = \frac{1}{2}\left[1 + \mathrm{erf}\left(\frac{x-\mu}{\sigma\sqrt{2}}\right)\right], \quad (4)$$

where $$\Phi(x) = \frac{1}{\sqrt{2\pi}} \int_{-\infty}^{x} e^{-\frac{t^2}{2}} dt$$

is the Laplace function (it is an odd function) and $$\mathrm{erf}(x) = \frac{1}{\sqrt{\pi}} \int_{-x}^{x} e^{-t^2} dt$$

is the error function. These two functions cannot be expressed in terms of elementary functions, but there are many known numerical approximations for them.

By using the property of the normal distribution, one can evaluate the probability of the fact that the random value X will be inside the range $x_1$ to $x_2$:

$$P(x_1 \leq X \leq x_2) = \Phi\left(\frac{x_2-\mu}{\sigma}\right) = \Phi\left(\frac{x_1-\mu}{\sigma}\right). \quad (5)$$

The tolling system can base its assessment of a toll on multiple sequential location estimations, taking into account the 'majority rule'. Such an approach results in higher probability of correct estimation in comparison with a single measurement (see numerical examples hereinafter).

If each measurement can be treated as a statistically independent event, having exactly two possible outcomes (correct and wrong lane evaluation), the process of multiple evaluations will become a Bernoulli trial (or binomial trial). If the probability of a correct single measurement is P, then the probability of exactly K correct estimations in the N experiments is equal to $$B(N,P) = C_K^N P^K (1-P)^{N-K}, \quad (6)$$

where $$C_K^N = \frac{N!}{K!(N-K)!}$$

is a binomial coefficient.

Numerical Example #1

Let W=1.9 m is the width of the vehicle, L=3.7 m is the width of a traffic lane (this is the U.S. Interstate Highway System standard) and $\sigma$=1 m is the standard deviation of the vehicle location estimation errors (accounting both IMU, GPS errors and map data errors).

According to the assumption 1, the vehicle's tires does not leave the used lane, therefore the maximum deviation of the vehicle from the lane's center (in the left and right directions) is $\delta=$ $$\frac{L-W}{2} = \frac{3.7-1.9}{2} = 0.9 \text{ m.}$$

According to expression (5), the probability that the vehicle is correctly estimated at the actual lane varies on the vehicle's position at the lane, is equal:

in the most left vehicle's position to $$\Phi\left(\frac{1.85+0.9}{1}\right) - \Phi\left(\frac{-1.85+0.9}{1}\right) = 0.997020 - 0.171056 = 0.825964,$$

in a center of the lane to $$\Phi\left(\frac{1.85}{1}\right) - \Phi\left(\frac{-1.85}{1}\right) = 0.967843 - 0.032157 = 0.935686,$$

in the most right vehicle's position to $$\Phi\left(\frac{1.85-0.9}{1}\right) - \Phi\left(\frac{-1.85-0.9}{1}\right) = 0.828945 - 0.00298 = 0.825964.$$

Thus, for the case of σ=1 m, the probability of correct lane estimation varies from 0.825964 (when the vehicle moves at the lane's periphery) to 0.935686 (when the vehicle moves in the lane's center).

The probabilities of exactly K correct estimations in N=10 measurements, calculated by expression (6) for the 'worst' case (P=0.825964), when the vehicle constantly moves at the lane's periphery, are presented in Table 1.

TABLE 1

The probabilities of exactly K correct estimations in the N = 10 measurements with σ = 1 m

| K | 0 | 1 | 2 | 3 | 4 | 5 | 6 | 7 | 8 | 9 | 10 |
|---|---|---|---|---|---|---|---|---|---|---|---|
| B(N,P) | 0 | $1.2 \cdot 10^{-6}$ | $2.6 \cdot 10^{-5}$ | $3.2 \cdot 10^{-4}$ | $2.7 \cdot 10^{-3}$ | 0.015 | 0.061 | 0.166 | 0.295 | 0.311 | 0.148 |

Applying the 'majority rule' for the lane location estimation, the accumulative probability of incorrect lane estimation, based on 10 measurements with σ=1 m, will be $3 \cdot 10^{-3}$ (the sum of the probabilities for K=0, . . . 4).

Numerical Example #2

All data are the same as in example #1, except of σ=0.5 m.

In this case, the probability that the vehicle is correctly estimated at its actual lane is equal:

in the most left vehicle's position to $$\Phi\left(\frac{1.85+0.9}{0.5}\right) - \Phi\left(\frac{-1.85+0.9}{0.5}\right) = 1 - 0.028717 = 0.971283,$$

in a center of the lane to $$\Phi\left(\frac{1.85}{0.5}\right) - \Phi\left(\frac{-1.85}{0.5}\right) = 0.999892 - 0.000108 = 0.999784,$$

in the most right vehicles position to $$\Phi\left(\frac{1.85-0.9}{0.5}\right) - \Phi\left(\frac{-1.85-0.9}{0.5}\right) = 0.971283 - 0 = 0.971283.$$

Thus, for the case of σ=0.5 m, the probability of correct lane estimation varies from 0.971283 (when the vehicle moves at periphery of the lane) to 0.999784 (when the vehicle moves in the lane's center).

The probabilities of exactly K correct estimations in N=10 measurements, calculated by expression (6) for the 'worst' case (P=0.971283), when the vehicle constantly moves at the lane's periphery, are presented in Table 2.

TABLE 2

The probabilities of exactly K correct estimations in the N = 10 measurements with σ = 0.5 m

| K | 0 | 1 | 2 | 3 | 4 | 5 | 6 | 7 | 8 | 9 | 10 |
|---|---|---|---|---|---|---|---|---|---|---|---|
| B(N,P) | 0 | 0 | 0 | 0 | $10^{-7}$ | $4.3 \cdot 10^{-6}$ | $1.2 \cdot 10^{-4}$ | $2.3 \cdot 10^{-3}$ | $2.9 \cdot 10^{-2}$ | 0.221 | 0.747 |

Using the 'majority rule' for the lane location estimation, the accumulative probability of incorrect lane estimation, based on 10 measurements with σ=0.5 m, will be $10^{-7}$ (the sum of the probabilities for K=0 . . . 4).

Thus, if the vehicle location, taking into account errors in the map and in the satellite based or other location system, has a combined standard deviation of 1 meter, taking into account that the vehicle may not be traveling in the exact center of the lane, there is about a 0.3% probability that the system will believe that the vehicle is in a different lane from where it is in fact located and with a standard deviation of 0.5 meter this probability reduces to 0.00001%. This is evaluation is based on 10 calculations and if the vehicle stays in a particular lane to allow many more such calculations, then these probabilities will become lower. However, to guarantee that the vehicle stays in a particular lane requires that a barrier between the lanes is in place which is not only expensive but also reduces the flexibility of a vehicle driver to change lanes. No currently available mapping and vehicle location system is believed to be capable of providing the one sigma accuracy of 1 meter and in fact even 5 or 10 meters cannot be guaranteed. Thus, no currently available system is believed to be able provide the information to automatically locate a vehicle in a particular lane and thus tolling by lanes where vehicles can freely change lanes depending on the current situation has not generally been considered possible. This places significant restrictions on toll road design, significantly increases infrastructure cost and has the effect of reducing road use efficiency. A driver should have the option of traveling on a tolled lane when needed and not be required to make this choice at the beginning of a long stretch of roadway.

This invention makes use of a transmitter within the vehicle which, at the appropriate vehicle locations, transmits the vehicle ID to a tolling administration for the purpose of calculating and charging the vehicle owner or operator a requisite toll. Many different transmitter designs can be used while practicing this invention. A permanently mounted device on the vehicle can perform this function. One advantage is that the device can be programmed to know the class of the vehicle allowing different vehicles to be charged different tolls, however it cannot automatically know if a trailer is in tow. Another approach is to purchase a tag which can be mounted at any convenient place in the vehicle in a similar manner as the EZ-Pass tag is now used. One form of such a tag is registered to a particular vehicle and can only be used with that vehicle. Thus, when passing a toll station, a check can be made to verify that the proper tag is being used based on optically reading the vehicle license plate. Thus, a toll tag for an automobile cannot be used on a truck. Nor can a stolen tag be used on a different vehicle. To catch a person engaging in such a fraudulent transaction requires that there be vehicle checking infrastructure and associated administration which is expensive. A second approach is to allow the tag to be associated with the tag owner and to be used on any vehicle where the class of the vehicle is registered when the vehicle passes the tolling infrastructure. All of these systems require tolling infrastructure at every toll location. An additional and preferred device is to use a standard smart phone. Initially, this smart phone can be used in a similar manner as conventional tags with the exception that the transmission from the cell phone to the tolling administration will take place through the cell phone system or in some cases, a local Wi-Fi or DSRC system. The smart phone will contain an "app" which either utilizes a map which is resident on the smart phone or the map which is resident on a vehicle to determine at what points the ID should be sent to the tolling administration. A receiver can be placed in the vicinity of the roadway, as described above, to verify that a transmission took place. The smart phone can automatically obtain the vehicle class information including the presence of a trailer from a vehicle resident system.

To prevent tampering with this system, various forms of encryption can be used. The vehicle operator with his or her smart phone upon entry into the vehicle would pair his or her smart phone either manually or automatically with the vehicle system. Initially, if the operator fails to pair his or her smart phone a backup tolling system using a license plate recognition system can be used. Since initially this system will be used in parallel with existing tolling systems, many of which already have license plate recognition systems, this adds minimal additional cost to the system. However, as described below, once the smart phone based system becomes ubiquitous and other tolling systems are eliminated then tolling flexibility is substantially increased and in fact at little or no additional cost all roads and other facilities can be automatically tolled. Since virtually anyone who can afford an automobile also possesses a smart phone, the implementation of this system is likely to be substantially less expensive than all other tolling systems.

For the purpose of this invention, a smart phone will be defined as any device which is portable and can be used for tolling purposes.

Smart phones are now frequently used for paying for transactions in place of credit cards. Smart phones also frequently contain information which the owner considers private and proprietary and would not like other people to possess. Smart phones are now being made substantially more secure through various biometric and or password systems. As smart phones are used more and more for paying for transactions, their security will undoubtedly increase. Thus, smart phones either now or in the near future have protection against being stolen and used by the thief. This same protection prevents use by a thief of the smart phone for running up tolls on other vehicles. It is thus far more secure from fraudulent tolls than the portable tag systems now in use. In the case where the thief can break the security or the smart phone does not have sufficient security, the owner can report the loss or theft of his or her smart phone and if it is used for tolling purposes, the authorities can quickly locate the vehicle and thus the stolen phone.

When the phone pairs with the vehicle, the vehicle class can be automatically transmitted to the phone for toll calculation purposes. Similarly, if one or more trailers have been attached to the vehicle, the vehicle system can detect that event and similarly make that known to the tolling system through the smart phone.

While the invention has been illustrated and described in the drawings and the foregoing description, the same is to be considered as illustrative and not restrictive in character, it being understood that only preferred embodiments have been shown and described and that all changes and modifications that come within the spirit of the invention are desired to be protected.

This application is one in a series of applications covering safety and other systems for vehicles and other uses. The disclosure herein goes beyond that needed to support the claims of the particular invention that is claimed herein. This is not to be construed that the inventors are thereby releasing the unclaimed disclosure and subject matter into the public domain Rather, it is intended that patent applications have been or will be filed to cover all of the subject matter disclosed above.

Preferred embodiments of the inventions are shown in the drawings and described in the detailed description below. Unless specifically noted, it is applicants' intention that the words and phrases in the specification and claims be given the ordinary and accustomed meaning to those of ordinary skill in the applicable art(s). If applicants intend any other meaning, they will specifically state they are applying a special meaning to a word or phrase. In this regard, the words velocity and acceleration will be taken to be vectors unless stated otherwise. Speed, on the other hand, will be treated as a scalar. Thus, velocity will imply both speed and direction.

Likewise, applicants' use of the word "function" in the detailed description is not intended to indicate that they seek to invoke the special provisions of 35 U.S.C. §112, 16 to define their inventions. To the contrary, if applicants wish to invoke the provision of 35 U.S.C. §112, 16, to define their inventions, he will specifically set forth in the claims the phrases "means for" or "step for" and a function, without also reciting in that phrase any structure, material or act in support of the function. Moreover, even if applicants invoke the provisions of 35 U.S.C. §112, 16, to define their inventions, it is applicants' intention that their inventions not be limited to the specific structure, material or acts that are described in preferred embodiments. Rather, if applicants claim their inventions by specifically invoking the provisions of 35 U.S.C. §112, 16, it is nonetheless their intention to cover and include any and all structures, materials or acts that perform the claimed function, along with any and all known or later developed equivalent structures, materials or acts for performing the claimed function.

For example, the present inventions make use of GPS satellite location technology to derive vehicle location. The inventions described herein are not to be limited to the specific GPS devices disclosed in preferred embodiments, but rather, are intended to be used with any and all such applicable satellite and infrastructure location devices, systems and methods, as long as such devices, systems and methods generate input signals that can be analyzed by a computer to accurately quantify vehicle location in real time. Thus, the GPS devices and methods shown and referenced generally throughout this disclosure, unless specifically noted, are intended to represent any and all devices appropriate to determine such location parameters.

Further, there are disclosed several processors or controllers, that perform various control operations. The specific form of processor is not important to the invention. In its preferred form, the computing and analysis operations can be divided into several cooperating computers or microprocessors. However, with appropriate programming well known to those of ordinary skill in the art, the inventions can be implemented using a single computer. Thus, it is not applicants' intention to limit their invention to any particular form or location of processor or computer. For example, it is contemplated that in some cases, the processor may reside in a smartphone or on a network connected to the vehicle such as one connected to the Internet.

Further examples exist throughout the disclosure, and it is not applicants' intention to exclude from the scope of their inventions use of structures, materials, or acts that are not expressly identified in the specification, but nonetheless are capable of performing a claimed function.

The invention claimed is:

1. A system for tolling vehicles capable of travelling in multiple lanes of a multi-lane roadway, comprising:
- a location determining system arranged partly on each vehicle to determine vehicle location at a plurality of different times during vehicular travel such that multiple locations are provided by said location determining system, said location determining system having an accuracy to be able to determine a specific one of a plurality of possible lanes of the multi-lane roadway in which the vehicle is located to thereby provide lane-specific location of the vehicle;
- a toll database including toll data about tolls for use of the plurality of possible lanes of the multi-lane roadway at a plurality of different geographic points, the toll data being different for different lanes of the multi-lane roadway at at least one of the plurality of geographic points;
- a communications device arranged on each vehicle; and
- a processor coupled to said location determining system and to said communications device and configured to direct a transmission including the determined vehicle location and an identification of the vehicle or an identification of said communications device using said communications device to a remote site separate and apart from the vehicle,
- whereby a toll is determined at the remote site based on said toll database and the determined vehicle location transmitted by said communications device to the remote site which is the lane-specific location of the vehicle or based on at least two determined vehicle locations transmitted by said communications device to the remote site each of which is a lane-specific location of the vehicle,
- wherein said communications device is configured to send the identification of the vehicle or the identification of said communications device to the remote site in or with each transmission of the determined vehicle location such that payment of the determined toll is charged to an entity associated with the vehicle or said communications device.

2. The system of claim 1, further comprising a tolling determination system at the remote site that receives the transmission of the determined vehicle location by said communications device and accesses said toll database to determine the toll for the vehicle on which said communications device providing the transmission is arranged.

3. The system of claim 1, wherein said processor is vehicle-resident.

4. The system of claim 1, wherein said communications device is further configured to send the transmission of the determined vehicle location to the remote site at least partly via the Internet.

5. The system of claim 1, wherein said communications device comprises a cellular phone.

6. The system of claim 1, wherein said processor is further configured to direct the transmission after and in response to reception of a tolling signal by said communications device.

7. The system of claim 1, further comprising a display in the vehicle, said processor being coupled to said display and further configured to cause said display to display data about tolls charged based on the transmission by said communications device.

8. The system of claim 1, further comprising a display in the vehicle, said processor being coupled to said display and further configured to cause said display to display data about tolls charged for a plurality of different travelable routes between two common locations.

9. The system of claim 1, wherein said processor is resident in said communications device.

10. An arrangement for tolling vehicles capable of travelling in multiple lanes of a multi-lane roadway, comprising:
- in each vehicle,
  - at least part of a location determining system that determines vehicle location at a plurality of different times during vehicular travel such that multiple locations are provided by said location determining system, said location determining system having an accuracy to be able to determine a specific one of a plurality of possible lanes of the multi-lane roadway in which the vehicle is located to thereby provide lane-specific location of the vehicle;
  - a communications device; and
  - a processor coupled to said location determining system and to said communications device and that directs a transmission including the determined vehicle location by said communications device to a remote site separate and apart from the vehicle,
  - said communications device being configured to send an identification of the vehicle or an identification of said communications device to the remote site in or with each transmission of the determined vehicle location;
- a toll database at the remote site that includes toll data about tolls for use of the plurality of possible lanes of the multi-lane roadway at a plurality of different geographic points, the toll data being different for different lanes of the multi-lane roadway at at least one of the plurality of geographic points; and
- a tolling determination and collection system coupled to said toll database at the remote site that receives the transmission of the determined vehicle location by said communications device and accesses said toll database to determine the toll for the vehicle on which said communications device providing the transmission is arranged based on data from said toll database and the determined vehicle location transmitted by said communications device to the remote site which is the lane-specific location of the vehicle or based on at least two determined vehicle locations transmitted by said communications device to the remote site each of which is a lane-specific location of the vehicle,
- said toll determination and collection system being configured to charge the determined toll for each vehicle to an entity associated with each vehicle or said communications device of each vehicle.

11. The arrangement of claim 10, further comprising imaging devices arranged along roadways and in positions to monitor passage of vehicles by the plurality of geographic points.

12. The arrangement of claim 11, wherein said communications device is further configured to send an identification of the vehicle to the remote site with the transmission of the determined vehicle location, said imaging devices comprising receivers configured to intercept transmissions from said communications device of the vehicle to the remote site and obtain an image of a vehicle that passes one of the plurality of geographic points and for which a transmission including the identification is not intercepted, for the purpose of an alternate toll charging method or to ascertain that the vehicle is attempting to avoid the toll.

13. The arrangement of claim 11, wherein said imaging devices are configured to process images to determine the presence of a towed trailer, whereby when multiple transmissions are not detected from the towed trailer, said imaging device obtains an image of a license plate of the towed trailer.

14. A method for tolling vehicles capable of travelling in multiple lanes of a multi-lane roadway, comprising:
- determining location of each vehicle at a plurality of different times during vehicular travel using a location determining system such that multiple vehicle locations are provided by the location determining system, the location determining system having an accuracy to be able to determine a specific one of a plurality of possible lanes of the multi-lane roadway in which the vehicle is located to thereby provide lane-specific location of the vehicle;
- directing a transmission of the determined vehicle location and an identification of the vehicle using a communications device on the vehicle to a remote site separate and apart from the vehicle; then
- accessing a toll database to determine a toll for each vehicle based on the determined vehicle location transmitted by the communications device to the remote site which is the lane-specific location of the vehicle or based on at least two determined vehicle locations transmitted by the communications device to the remote site each of which is the lane-specific location of the vehicle; and
- sending an identification of the vehicle or an identification of the communications device present in the vehicle or owned by a driver or occupant of the vehicle to the remote site in or with each transmission of the determined vehicle location such that the vehicle owner or vehicle operator or smartphone owner is charged for the determined toll.

15. The method of claim 14, further comprising:
- determining, at the remote site, distance that the vehicle has traveled since a previous transmission of the determined vehicle location, or its use of a fee-required infrastructure; and
- calculating a toll based on the toll database and the distance traveled or infrastructure use.

16. The method of claim 14, further comprising directing the transmission after and in response to reception of a tolling signal by the communications device.

17. The method of claim 14, further comprising:
- sending, a least partly via the Internet, the identification of the vehicle or the identification of the communications device to the remote site in or with the transmission of the determined vehicle location;
- monitoring passage of vehicles by the predetermined toll locations using imaging devices;
- intercepting transmissions from the communications device of the vehicle to the remote site and when a vehicle passes a predetermined toll location and does not transmit an identification, photographing the vehicle using the imaging devices; and
- processing images from the imaging devices to determine the presence of a towed trailer, and when multiple transmissions are not detected from the towed trailer, obtaining an image of a license plate of the towed trailer.

18. The method of claim 14, further comprising displaying data on a display in each vehicle about tolls charged based on the transmission from the communications device in that vehicle.

19. The method of claim 14, further comprising displaying data on a display in each vehicle about tolls charged for a plurality of different travelable routes between two common locations.

20. The method of claim 14, further comprising locating a map database on each vehicle such that the step of determining location of each vehicle at a plurality of different times during vehicular travel using the location determining system comprises accessing the map database to determine the lane in which the vehicle is located, and integrating the processor into the communications device.

* * * * *